United States Patent [19]
Von Haas

[11] Patent Number: 5,803,675
[45] Date of Patent: Sep. 8, 1998

[54] HOLDER FOR METAL-CUTTING TOOL INSERTS

[75] Inventor: Rainer Von Haas, Geesthacht, Germany

[73] Assignee: Widia GmbH, Essen, Germany

[21] Appl. No.: 649,668

[22] PCT Filed: Aug. 20, 1994

[86] PCT No.: PCT/DE94/00975

§ 371 Date: Jun. 7, 1996

§ 102(e) Date: Jun. 7, 1996

[87] PCT Pub. No.: WO95/13892

PCT Pub. Date: May 26, 1995

[30] Foreign Application Priority Data

Nov. 16, 1993 [DE] Germany ............... 93 17 533.7 U

[51] Int. Cl.$^6$ ............................................. B23B 27/04
[52] U.S. Cl. ................... 407/107; 407/110; 407/109
[58] Field of Search ......................... 407/107, 110, 407/109, 117

[56] References Cited

U.S. PATENT DOCUMENTS

| | | | |
|---|---|---|---|
| 3,191,262 | 6/1965 | Gustafson | 407/109 |
| 3,785,021 | 1/1974 | Norgren | 407/117 |
| 4,357,123 | 11/1982 | Zweekly | 407/110 |
| 5,035,545 | 7/1991 | Zinner | 407/109 |

FOREIGN PATENT DOCUMENTS

| | | |
|---|---|---|
| 0 095 062 A1 | 5/1983 | European Pat. Off. . |
| 0 152 729 A3 | 8/1985 | European Pat. Off. . |
| 0 259 846 A1 | 3/1988 | European Pat. Off. . |
| 2 127 619 | 10/1972 | France . |
| 30 44 790 A1 | 6/1981 | Germany . |
| 0 385 495 A1 | 9/1990 | Germany . |
| 39 06 822 A1 | 9/1990 | Germany . |
| 82 14 831.7 | 8/1991 | Germany . |

*Primary Examiner*—Daniel W. Howell
*Assistant Examiner*—Mark Williams
*Attorney, Agent, or Firm*—Herbert Dubno; Yuri Kateshov

[57] ABSTRACT

A holder assembly for a chip-removal tool insert has a holder member formed with two clamping jaws which are spaced apart and form an elongated slot there between, the slot is provided with an enlarged opening formed between curved surfaces on opposite inner faces of the jaws, the opening receives an expansion key rotatable in the slot for a further displacement of the jaws from each other during insertion of the chip removal tool in the slot.

7 Claims, 2 Drawing Sheets

HOLDER FOR METAL-CUTTING TOOL INSERTS

CROSS REFERENCE TO RELATED APPLICATIONS

This is a national phase of PCT/DE94/00975 filed 20 Aug. 1994 and based upon a German National Application G 93 17 533.7 filed 16 Nov. 1993 under the International Convention.

The invention relates to a holder for chip-removal tool inserts, particularly a piercing or cutting insert, held in a clamping slot and whose oppositely located clamping jaws have a slot area of an elongated shape wherein an expansion key with elliptical or oblong-oval cross section can be inserted and can be rotated thereby expanding the opposite jaws.

BACKGROUND OF THE INVENTION

Such holders are known for instance from the DE 39 06 822 C2 or the EP 0 095 062 B1. In the mentioned European patent specification the expansion of the clamping jaws in relation to each other is accomplished by inserting and turning an elliptic key in the ovally shaped area of the clamping slot. A disadvantage of this embodiment indicated in DE 39 06 822 C2 consists in that the precise geometrical shape of the oval slot area is not closer specified and therefore in this holding system an excessive expansion of the clamping slot, surpassing the elastic limits of the material, can not safely be avoided. Moreover for avoiding permanent deformation, particularly of the oppositely located clamping jaws, with the result that a stable clamping of the tool inserts can no longer be insured, as well as for facilitating the insertion and/or turning of the key bit, an oval slot area has to be provided in the holder, consisting of two recesses, each located in one of the opposite jaws, correspondingly to the two smaller vertex curvature circles of the elliptic cross section profiles and are at a distance from each other ranging approximately between the lengths of the bigger and the smaller ellipse axis. The disadvantage is that in this embodiment of the holder the guidance of the expansion key is not optimal.

Further from the DE-A-30 44 790 an ejection lever with an oblong-rounded attachment piece is known, which can be inserted in a circular recess limiting the clamping slot towards the rear. Here too the optimal guidance of the ejection lever is deficient during the ejection of the cutting insert.

Furthermore mountings for cutting inserts in disk milling cutters are known, which are arranged in a clamping slot which has a rear extension, located behind the clamped cutting insert. For the exchange of the cutting inserts a key is provided, whose first tongue is meant to engage in the mentioned extension, and the second, parallel tongue engages on a radial frontal surface of the disk-like mounting. The drawback of this system consists in the required long lever arm, which leads to a high radial stress load on the mentioned tongues and the danger of bending. Moreover a high expansion force is to be applied, which can damage the holder. A controlled release of the clamping stress is barely possible.

OBJECT OF THE INVENTION

It is the object of the present invention to further develop a holder of the kind mentioned in the introduction, so that during expansion of the laws the expansion key can be guided in a stable, safe and slide-resistant manner, while it still remains easy to handle.

SUMMARY OF THE INVENTION

This object is achieved due to the holder according to the invention and is characterized in that the elongated slot area has oppositely located part-circular enlargements, the distance between their vertices being smaller than the biggest distance between the elliptic or oblong-oval cross section profiles. Such enlargement can be created by drilling in the elongated slot area. The advantage over oblong-oval enlargements with flat or such limit surfaces, whose curvature radius is considerably bigger than the respectively effective radius of the expansion key, consists in the noticeably improved guidance of the expansion key. Also from the manufacturing point of view, such enlargements are easier to make than oval or oblong enlargements.

Advantageously when the expansion key is inserted, the transition points where the respective circular enlargement merge into the bordering elongated slot areas represent a 4-point support because of respective pairs of arcuate recesses formed on each jaw. This means that, regarding its position, the expansion key assumes a clearly defined position already during its insertion. When it is actuated by turning the expansion forces act evenly on the opposite surfaces sections due to the 4-point support.

According to a further embodiment of the invention, the distance between the jaws in the unexpanded slot areas outside the enlargements is smaller than the bigger half-axis, but bigger than small half-axis of the elliptic cross section profile or smaller than the maximal distance between two opposite limit points of an oblong-oval cross section profile.

Preferably the part-circular enlargements are arranged in an axially symmetric manner with respect to the longitudinal axis of the elongated slot, furthermore in such a way that the lower enlargement is bigger than the upper one.

According to a further embodiment the cross section profile of the expansion key consists basically of a rectangle, on whose short sides protuberances having the shape of circle segment are arranged. This dimensioning insures a clear guidance of the expansion key in the area of the circular enlargements. The surface of the cross section profile is edge-free or has only four edges on which the short sides border on the long sides. In the case of the first alternative a continuously friction-free transition is insured during expansion, while in the second case the operator of the expansion key will be able to notice the transition of its application from the long lateral surface to the short lateral surface of the expansion cross section.

The radius of the protuberances shaped like circular segments arranged on the short sides of the expansion key is bigger than the radius of the circular enlargements of the elongated slot area. Due to these measures, a favorable compromise between the optimal guidance and the lowest possible friction during expansion, i.e. while expansion key is turned, can be reached.

In a further preferred embodiment, the distance between the vertices of the opposite circular enlargements is bigger than the diameter of the circular enlargements of the elongated slot area. According to a further embodiment one of the jaws has a projecting stop which limits the insertion of the cutting insert, whereby the circular enlargements lie between this stop and the end of the slot area, preferably as close as possible to the stop. Due to a correspondingly long design of the slot area, an optimal elasticity of the clamping jaws can be insured.

BRIEF DESCRIPTION OF THE DRAWING

The above and other objects, features and advantages of the present invention will become more readily apparent from the following description, reference being made to the accompanying drawing in which:

FIG. 2b is a sectional view corresponding to lines 11 - 11 in FIG. 2a.

SPECIFIC DESCRIPTION

Figure 1:
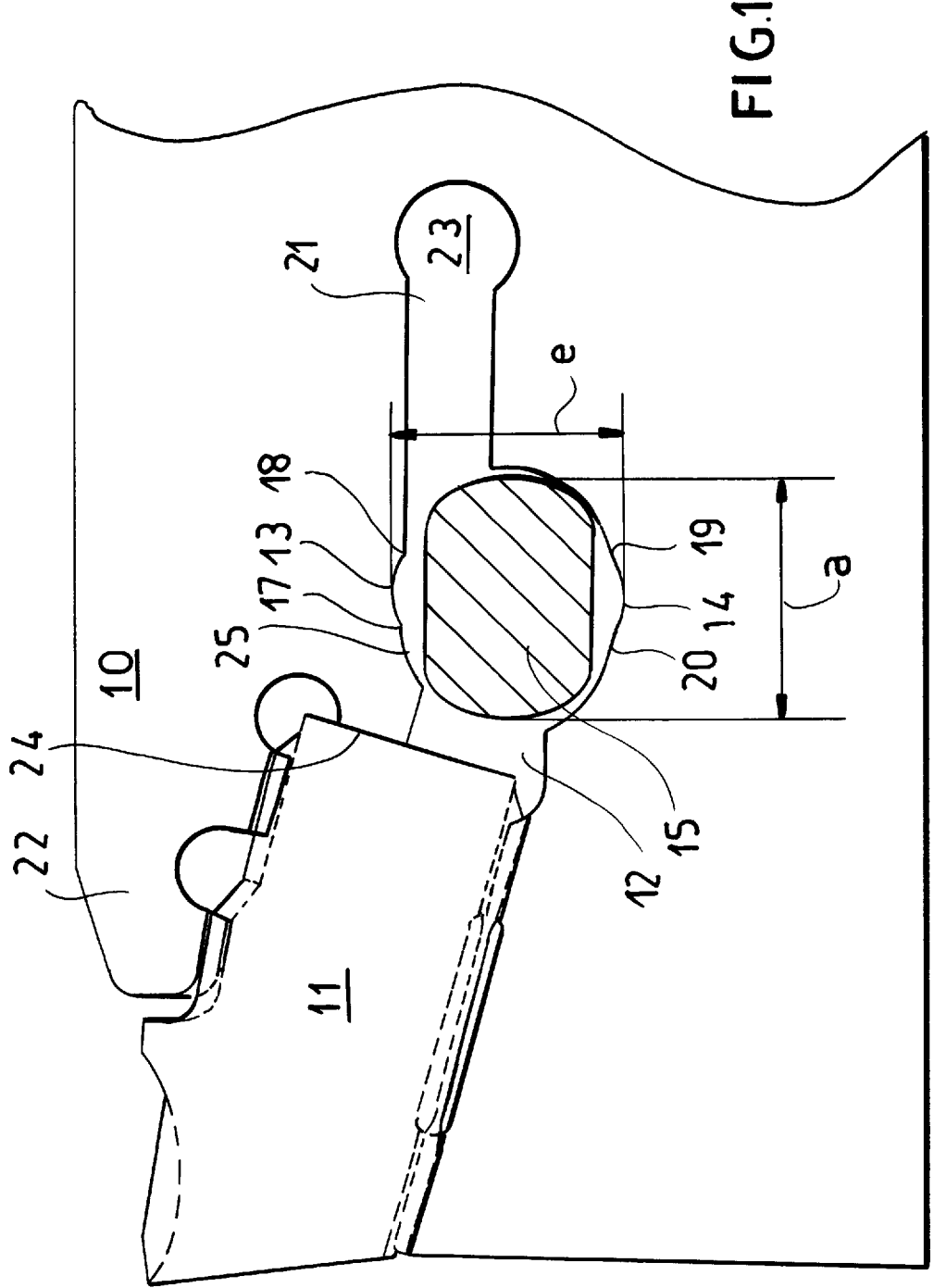
FIG. 1 is a side view of a holder with inserted cutting insert.
Figure 2B:
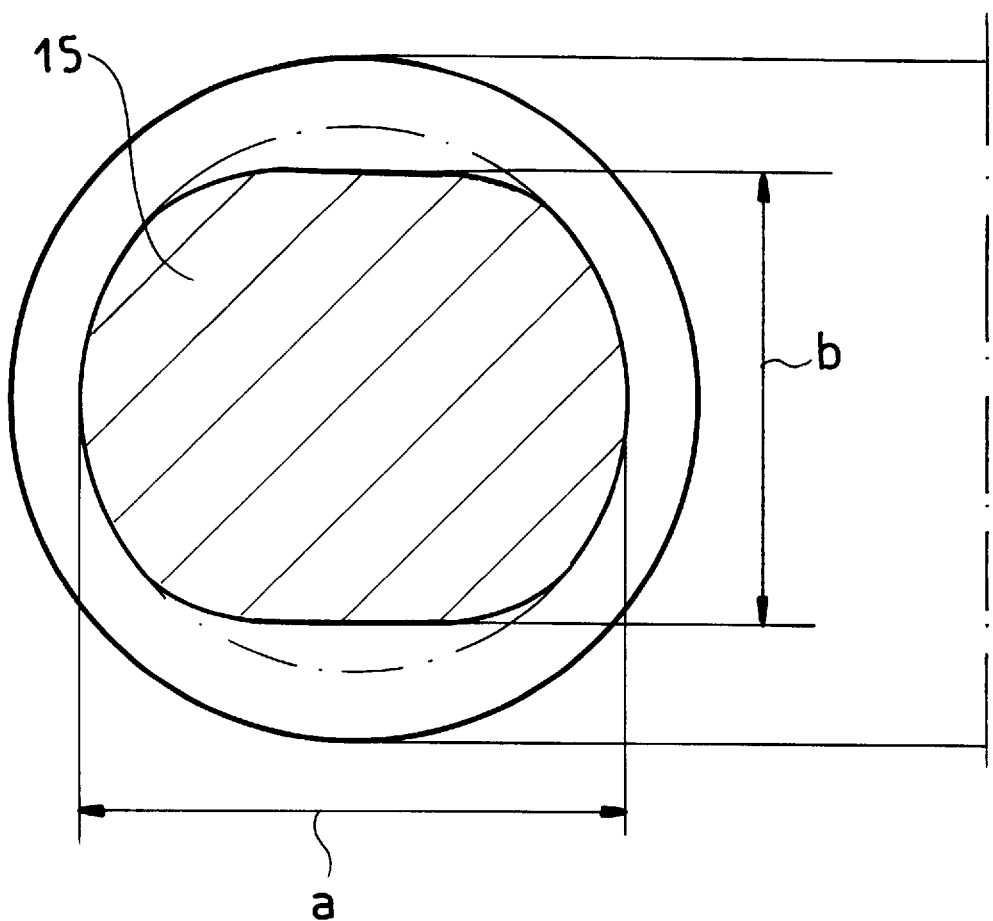
Figure 2A:
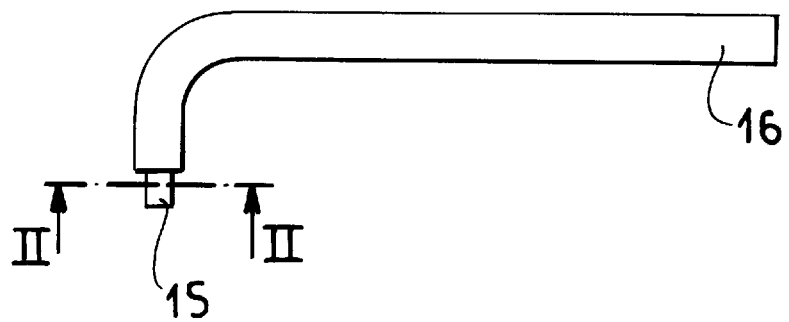
FIG. 2a is a wrench in a side view.

The respectively shown holder 10 has a clamping slot for mounting a cutting insert 11, whereby in the rear clamping slot extension 12 in the area of an enlargement to an elongated slot 25, enlargements 13 and 14 which are part-circular with respect to each other and arranged opposite to each other are provided, whose vertices are at a distance "e" which is smaller than the biggest distance "a" of the of the elliptical or oblong-oval cross section profile 15. This cross section profile is part of a wrench 16 and can be inserted so loosely, that the four points where the circular enlargements 13 and 14 merge into the elongated slot area 25 represent the only contact points 17 to 20 in the form of a 4-point support. By turning the key 16 by a maximum of 90°, the clamping jaw 22 can be propped up. The slot area 21, continuing the recess 13 towards the rear, ends in a circular enlargement 23.

The slot area 12, 25, 21 is a rearward continuation of the clamping slot wherein the cutting insert 11 is clamped. The upper clamping jaw 22 has also a stop 24 as a rearward limitation. The circular enlargements 13 and 14 are positioned relatively close to the stop 24, in any case clearly at a distance from the circular rear enlargement 23. This way a sufficient lever arm is available for expansion, whose length is defined by the distances of the enlargements 13 and 14 from the end area 23.

A detailed description of such a piercing insert is furnished in the documents filed in P 42 36 370.5, to which reference is made herewith.

I claim:

1. A holder assembly for a chip-removal tool insert comprising:

a holder member formed with first and second spaced apart jaws each having respective inner surfaces facing one another and forming an elongated slot therebetween, each of said inner surfaces being formed with a respective front portion thereof extending rearwardly from a front face of the holder member and with a respective rear portion, each of said rear and front portions of the respective inner surface being bridged by a respective curved surface extending outwardly into the respective jaw, so that an enlarged opening is formed in said slot, each of said curved surfaces being formed with:

a respective front arcuate recess merging into a rear arcuate recess and forming a respective first bump therewith which extends inwardly into said enlarged opening, the respective rear recess running into the rear portion of the inner surface of the respective jaw to form a respective second bump therewith, said second rear recesses of said inner surfaces of said first and second jaws being formed with respective apexes which are spaced apart at a first distance; and an expansion key formed with two parallel opposite sides bridged by two outwardly convex sides which are spaced apart at a second distance greater than said first distance, said key being rotatably insertable in said opening for spreading said jaws further apart upon contact of said convex sides with said first and second bumps of each of the inner surfaces of the jaws to receive a chip-removal tool between front portions of the inner surfaces of the jaws.

2. The holder assembly defined in claim 1 wherein said first and second bumps of the first and second inner surfaces of the jaws form a four-point contact support against said key.

3. The holder assembly defined in claim 1 wherein said enlarged opening has a longitudinal axis and said first and second arcuate surfaces of the first and second inner surfaces are arranged symmetrically opposite one another with respect to said axis.

4. The holder assembly defined in claim 1 wherein said parallel sides of the expansion key are spaced apart at a third distance less than second distance, said first arcuate recesses of the inner surfaces of the first and second jaws being formed with respective apexes which are spaced apart at a fourth distance smaller than half of said second distance but greater than half of said third distance.

5. The holder assembly defined in claim 4 wherein said convex sides of the expansion key are formed with a radius which is greater than a radius of said arcuate recesses.

6. The holder assembly defined in claim 1 wherein the front portion of the inner surface of the first jaw is formed with a stop arresting displacement of the chip-removal tool upon insertion thereof in a clamping portion of the slot defined between front portions of the inner surfaces of the jaws, said first arcuate recess of the inner surface of the first jaw located in said enlarged opening being spaced rearwardly from said stop.

7. The holder assembly defined in claim 6 wherein said enlarged opening of the slot is wider than the clamping portion.

* * * * *